Feb. 5, 1957

C. A. DOWNS 2,780,714

COMBINED WATER AND AIR HEATING UNIT

Filed July 27, 1954

C. A. Downs
INVENTOR

BY *CA Snowles*
ATTORNEYS.

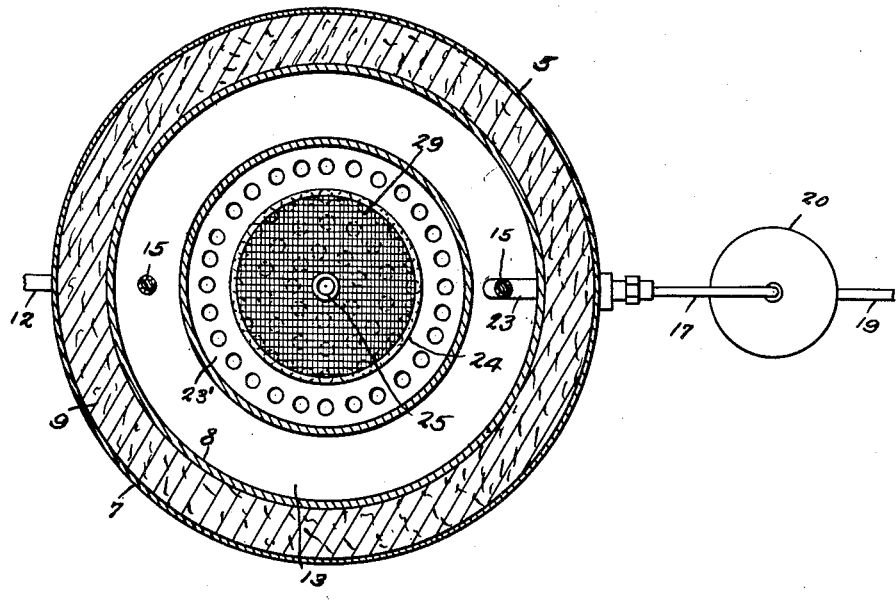
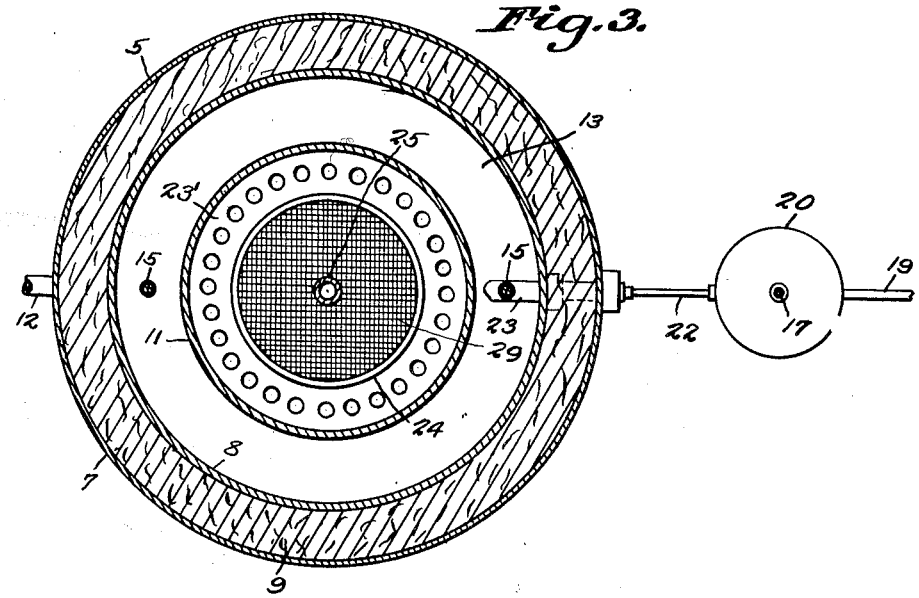

United States Patent Office 2,780,714
Patented Feb. 5, 1957

2,780,714

COMBINED WATER AND AIR HEATING UNIT

Cas A. Downs, Charleston, W. Va.

Application July 27, 1954, Serial No. 446,029

3 Claims. (Cl. 219—38)

This invention relates to a combined hot water and hot air unit wherein electricity is employed as the heating element, heating a body of water for domestic use.

An important object of the invention is to provide a unit of this character including an upright tank or boiler in which the heated water is contained, the tank or boiler being so constructed that a passageway is provided through the center or longitudinal axis of the tank through which air to be heated will be directed upwardly through the passageway and heated, means being provided within the passageway for spreading the air laterally into contact with the inner wall of the heater, absorbing heat from the inner wall of the heater, the hot air being delivered from the tank or boiler at the top thereof, into the room area to be heated.

Still another object of the invention is to preheat the water entering the tank, thereby maintaining a more even temperature of the water within the tank.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 2 is a transverse sectional view taken on line 2—2 of Fig. 1.

Fig. 3 is a transverse sectional view taken on line 3—3 of Fig. 1.

Figure 1:
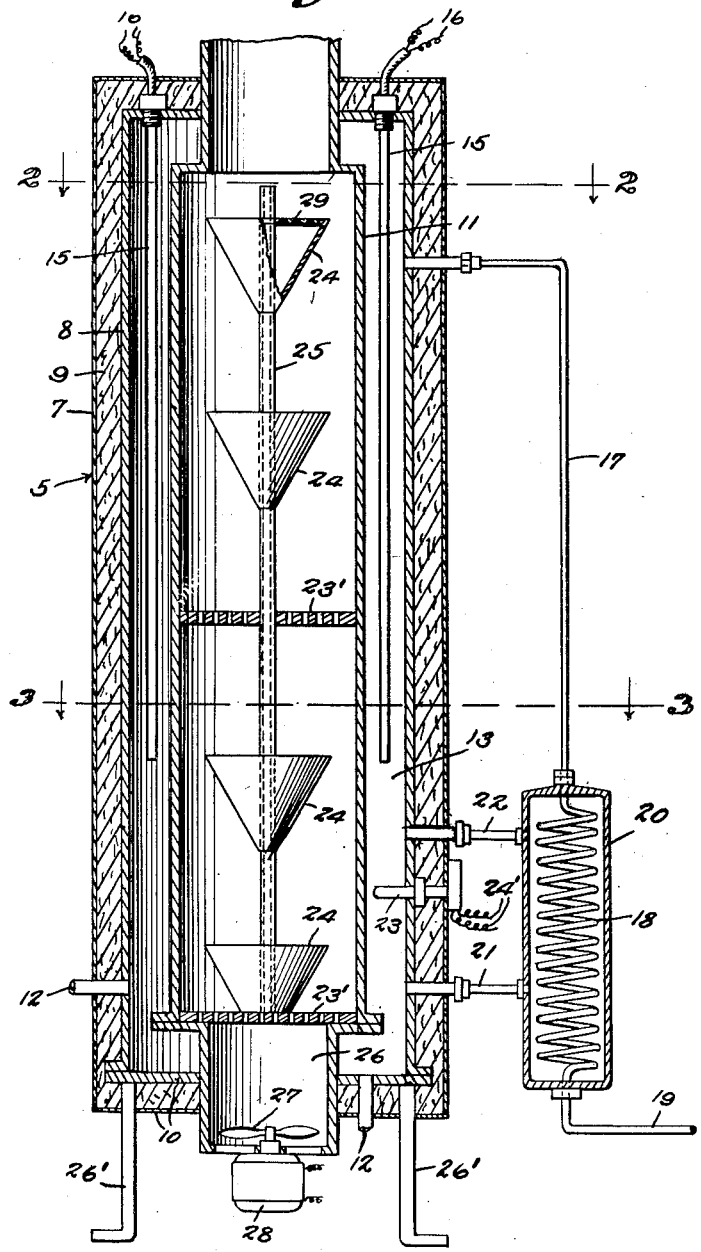
Figure 1 is a longitudinal sectional view through a water and air heating unit, constructed in accordance with the invention.

Referring to the drawings in detail, the tank embodies an outer wall indicated generally by the reference character 5, the outer wall comprising spaced inner and outer sections 7 and 8 respectively spaced apart, between which insulating material 9 is contained.

As shown, the sections 7 and 8 have bottoms 10 which are also spaced apart to receive the insulating material. The insulating material 9 also insulates the upper or top sections of the tank from each other.

The reference character 11 indicates a pipe which extends through the tank 5 as clearly shown by Fig. 1 of the drawings, the pipe 11 providing a passageway for air to be heated, which is forced through the pipe 11.

The pipe 11 is so arranged with respect to the outer wall of the heater, that a water chamber 13 is provided therebetween, the water chamber having outlet pipes 12 extending from the bottom thereof, which outlet pipes afford means for taking off water to supply domestic purposes, from the tank.

Electric heating elements 15 extend through the top of the tank, and are suspended in the water held within the water chamber 13, the electric heating elements being supplied with electric energy through the wires 16 which connect with a suitable source of electricity supply, for heating the water of the water chamber 13 in which the electric heating elements 15 are submerged.

Water enters the chamber 13, through the pipe 17 which communicates with the chamber 13 at its upper end, the lower end of the pipe 17 being connected with the coil 18 to which the water supply pipe 19 connects.

The coil 18 is housed within the tank 20, which tank 20 is in communication with the water chamber 13 adjacent to the lower end thereof, through the pipes 21 and 22. The pipes 21 and 22 permit of a circulation of hot water from the chamber 13 to maintain the coil 18 hot so that water entering the chamber 13 through the pipe 17 and coil 18, will be preheated on its passage through the coil, thereby avoiding delivering cold water to the hot water chamber 13.

A thermostat 23 extends through the wall of the hot water tank, and is connected with a switch for controlling the electric current to the electric heating elements 15, through the wires 24', so that the temperature of the water within the water chamber 13, may be automatically controlled.

Secured within the pipe 11 are spaced perforated partitions 23' which partitions provide a support for the inverted cone-shaped baffles 24 which are secured to the baffle supporting rod 25 shown as extending through central openings formed in the partitions 23'.

At the lower end of the pipe 11, is a fan chamber 26 in which the fan 27 operated by the motor 28 is located. Thus it will be seen that due to this construction, air will be forced through the perforations of the partitions 23', the air striking the baffles 24, which baffles spread the air laterally into contact with the pipe 11. The air striking the inner surface of the pipe 11, will absorb heat from the pipe 11, the heated air being discharged from the pipe 11, through the open upper end thereof, where the air may be distributed in predetermined room areas.

Supporting legs 26' are connected with the bottom of the tank, and afford means for supporting the tank in an upright position.

The baffles 24 have their wide surfaces formed of foraminous material 29 which not only acts as a filtering means for preventing sediment from collecting in the baffles, but at the same time dissipates heat and prevents overheating of said baffles.

Due to the construction shown and described, it will be seen that I have provided a combined water and air heating device in a single unit, the air passing through the unit becoming heated by contact with the wall of the pipe 11, thereby conserving heat.

While I have shown and described the heater as of the electric type, it is to be understood that it is within the scope of the invention to substitute a suitable gas burner for the electric elements, if desired.

Having thus described the invention, what is claimed is:

1. A heater of the class described, comprising a tank embodying an outer wall and a pipe extending longitudinally through the center of said tank providing a water chamber between the pipe and said outer wall, submerged electric water heaters disposed within said water chamber heating water therein, a water inlet pipe for delivering water to said water chamber, a water coil connected with said water inlet pipe, a tank in which said water coil is mounted, pipes establishing communication between said water chamber and said tank in which said water coil is mounted, directing hot water therethrough, preheating the water in said water coil prior to its entrance to said water chamber, and means for directing a volume of air through said pipe, heating the air delivering the air into a room area, through one end of said pipe.

2. A heater of the class described, comprising a tank embodying inner and outer spaced sections, the space between the sections providing a water chamber, submerged water heating units disposed within said water chamber, means for supplying preheated water to said water chamber, said inner section being hollow with open ends, inverted cone shaped baffles within the inner section for directing air laterally within the inner section heating the air passing through the inner section by contact with the wall of the inner section, and means for directing a volume of air through said inner section.

3. A heater of the class described comprising a tank embodying inner and outer sections spaced apart, the space between the inner and outer sections providing a water chamber, submerged electric heating units within the water chamber heating the water within said chamber, pipes for leading hot water from said chamber, said inner section being hollow with open ends, a plurality of spaced superposed inverted cone shaped baffles within the inner section adapted to direct air laterally into contact with the wall of the inner section heating the air, and an electric motor mounted at the lower end of said inner section for directing a volume of air through said inner section.

References Cited in the file of this patent

UNITED STATES PATENTS

| | | |
|---|---|---|
| 1,269,052 | Clark et al. | June 11, 1918 |
| 2,438,834 | Wartes | Mar. 30, 1948 |
| 2,455,988 | Fife | Dec. 14, 1948 |
| 2,643,323 | Carlson et al. | June 23, 1953 |